Nov. 8, 1938.       W. W. MOWRY       2,136,116
INTEGRATING X-RAY APPARATUS
Filed Jan. 4, 1934       5 Sheets—Sheet 1

INVENTOR.
WILLIAM W. MOWRY
BY Chester Tietig
ATTORNEY.

Nov. 8, 1938.   W. W. MOWRY   2,136,116
INTEGRATING X-RAY APPARATUS
Filed Jan. 4, 1934   5 Sheets-Sheet 2

Inventor
WILLIAM W. MOWRY
By Chester Tietig
Attorney

Nov. 8, 1938.    W. W. MOWRY    2,136,116
INTEGRATING X-RAY APPARATUS
Filed Jan. 4, 1934    5 Sheets-Sheet 3

INVENTOR.
WILLIAM W. MOWRY
BY Chester Tietig
ATTORNEY

Fig. 6 GROUPING OF PARTS ACCORDING TO THEIR ORDER OF EXPOSURE — TIME RELATION OF ANATOMICAL GROUPS

| | PART | POSITION | DIST | CONE No. | M1 | M3 | M3 | M9 |
|---|---|---|---|---|---|---|---|---|
| A | ESOPHAGUS | OBLIQUE | 30" | 12 | 7 | 21 | 21 | 63 |
| B | RIBS ABOVE DIAPHRAGM | P.A. A.P. OBL. | 30" | 20 | 11 | 33 | 33 | 99 |
| C | LUNGS AND HEART | P.A. A.P. | 72" | 9 | 18 | 54 | 54 | 162 |
| D | DORSAL | LATERAL | 30" | 20 | 24 | 72 | 72 | 216 |
| | GALL BLADDER | P.A. | 30" | 9 | | | | |
| E | LUNGS AND HEART | OBLIQUE | 72" | 9 | 26 | 78 | 78 | 234 |
| | STOMACH | P.A. A.P. OBL. | 30" | 20 | | | | |
| | COLON | P.A. A.P. OBL. | 30" | 20 | | | | |
| | EXTREMITIES | A.P. LAT. OBL. | 36" | 9 | | | | |
| | RIBS ABOVE DIAPHRAGM | A.P. P.A. OBL. | 72" | 9 | | | | |
| F | JAW | LAT. OBL. | 30" | 7 | 32 | 96 | 96 | 288 |
| | RIBS BELOW DIAPHRAGM | A.P. P.A. OBL. | 30" | 20 | | | | |
| | CERVICAL | A.P. | 30" | 7 | | | | |
| | DORSAL | LATERAL | 30" | 20 | | | | |
| G | LUNGS AND HEART | LATERAL | 72" | 9 | 36 | 108 | 108 | 324 |
| H | GROUP No.1 DENTAL | | CONE CONTACT | 5 | 40 | 120 | 120 | 360 |
| I | SKULL | P.A. A.P. | 30" | 12 | 48 | 144 | 144 | 432 |
| | SKULL | LATERAL | 30" | 12 | | | | |
| | LATERAL SINUS | LATERAL | 30" | 6 | | | | |
| J | MASTOID | SPECIAL ANGLE | 30" | 4 | 54 | 162 | 162 | 486 |
| | URINARY TRACT | A.P. | 30" | 20 | | | | |
| K | LUMBAR | A.P. | 30" | 20 | 60 | 180 | 180 | 540 |
| | SACRAL | A.P. | 30" | 20 | | | | |
| | PELVIS | A.P. | 30" | 20 | | | | |
| L | FRONTAL SINUS | P.A. A.P. | 30" | 6 | 66 | 198 | 198 | 594 |
| M | GROUP No.2 DENTAL | | CONE CONTACT | 4 | 80 | 240 | 240 | 720 |
| N | LUMBAR | LATERAL | 30" | 20 | 108 | 324 | 324 | 972 |
| | SACRAL | LATERAL | 30" | 20 | | | | |
| O | GROUP No.3 DENTAL | | CONE CONTACT | 4 | 120 | 360 | 360 | 1080 |
| P | CERVICAL | LATERAL | 72" | 6 | 144 | 432 | 432 | 1296 |

INVENTOR.
WILLIAM W. MOWRY
BY Chester Tietig
ATTORNEY.

Patented Nov. 8, 1938

2,136,116

UNITED STATES PATENT OFFICE 2,136,116

INTEGRATING X-RAY APPARATUS

William W. Mowry, New York, N. Y., assignor to The Kelley-Koett Manufacturing Company, Inc., Covington, Ky., a corporation of Ohio Application January 4, 1934, Serial No. 705,267

17 Claims. (Cl. 250—34)

This invention relates to improvements in X-ray apparatus and to X-ray technique whereby more accurate diagnostic and analytical results are obtained and for accomplishing a more precise and reliable control for therapeutic and radiographic procedure.

An object of this invention is to provide an improved apparatus and technique adapted to provide standardized diagnostic results in order that a quantitative measure of pathological changes may be obtained by accurate determination of variations in density of the subject during the observation period. Another object of the invention is to provide an improved X-ray apparatus having a plurality of interrelated circuits and control means whereby variable quantities normally existing in X-ray circuits are maintained constant and compensation may be obtained for variable quantities pertaining to radiographic material, processing and accessories so that the results may be referred to a reference standard in order that quantitative measure of density change may be ascertained.

Another object is to provide an improved apparatus and technique whereby minute density change in the subject occurring over an extended period of observation may be ascertained with accuracies not heretofore obtainable and which may be accomplished so simply that a person less skilled in the art of manipulation may competently carry on the operation. Further, the improved apparatus and technique may be employed to carry on conventional methods of procedure in addition to the improved technique of the invention.

The objects set forth above are obtained by use of a plurality of circuits for the control of an X-ray tube which are interrelated and electrically compensated to obtain corrected ratios of milli-amperes in the X-ray tube circuit, time of exposure and peak kilo-voltage which values have been established by theoretical and experimental data as necessary for the standardized procedure herein described. More particularly, a relationship has been established between the milli-amperes and time of exposure necessary to give the desired results in each anatomical class and the value of voltage necessary to apply across the tube for the various thicknesses of parts under observation. If the voltage is established at a certain value for each depth of part, the quantity of radiation expressed in terms of the product of milli-amperes multiplied by seconds can be maintained constant for each anatomical grouping. Thus, by choosing the proper voltage for the depth to be penetrated and knowing the particular group of the anatomical class, the proper energy to maintain the desired standard will always be available. This standard has been chosen to afford properly exposed X-ray plates which will be of greatest diagnostic or analytical value.

Figure 5:
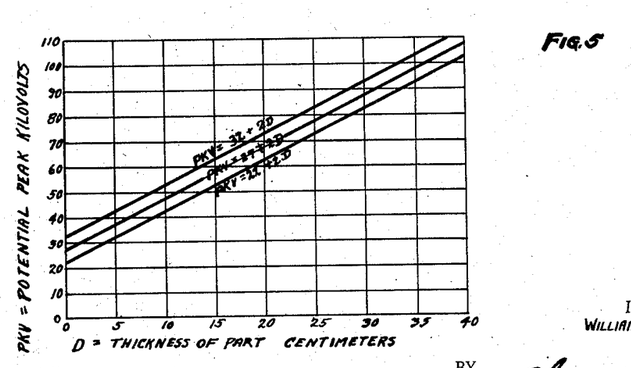
Fig. 5 is a graph showing a middle line indicating a preferred average technique and parallel side lines indicating permissible variation from the average by the machine. Solving the equations given in this graph according to the data previously given, we have, assuming D to be 1 cm.

In order to select the proper voltage for the various depth of parts an empirical equation has been determined based on standard operating conditions from which average voltage values may be ascertained to give the most satisfactory results. This empirical equation is represented by the following mathematical expression:

$$PKV = 27 + 2D$$

wherein PKV is peak-kilovoltage and D is the thickness of the part in centimeters. In practice it has been found that excellent results can be obtained by maintaining the voltage within a plus or minus limit of five as applied against the constant 27 and if these results are plotted on a graph as is shown in Figure 5, a curved area is formed which defines the diagnostic limits forming a basis for the standardized procedure which has been determined. In order to make practical use of the relationship outlined above, it is an object of this invention to provide an X-ray apparatus having control means which will automatically adjust certain of the variable factors inherent in the device in accordance with the energy curve of the empirical equation.

Referring now to the accompanying drawings.

$PKV$ equals 32 plus $2D$ equals 34 $KVP$
$PKV$ equals 27 plus $2D$ equals 29 $KVP$
$PKV$ equals 22 plus $2D$ equals 24 $KVP$

There is now sufficient data to derive the fundamental principle intended to govern the apparatus, namely that for the correct capacity of focus of X-ray tube for the given apparatus, the number of peak kilovolts used should never be less than 24 KVP for a part 1 cm. thick and should increase two KVP for every added centimeter of part thickness. Latitude from this standard is provided to suit abnormal patients, i. e., young children and old people, both classes furnishing denser X-ray shadows. This technique is especially intended for any incandescible cathode X-ray tube capable of withstanding the voltages called for within the range of milliamperes adapted to the tube's capacity.

Figure 4:
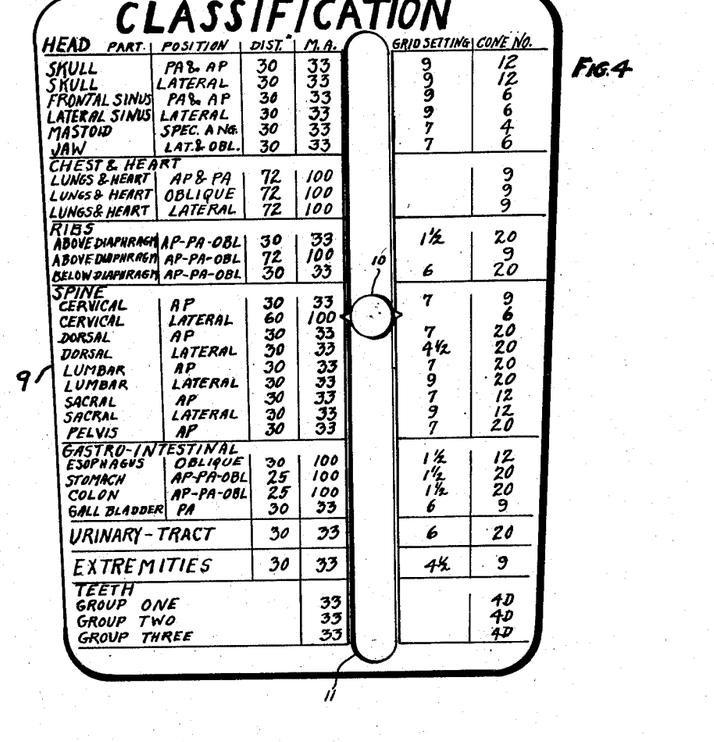
Fig. 4 is an enlarged plan view of the classification table shown on the board in Fig. 3.
Figure 6:
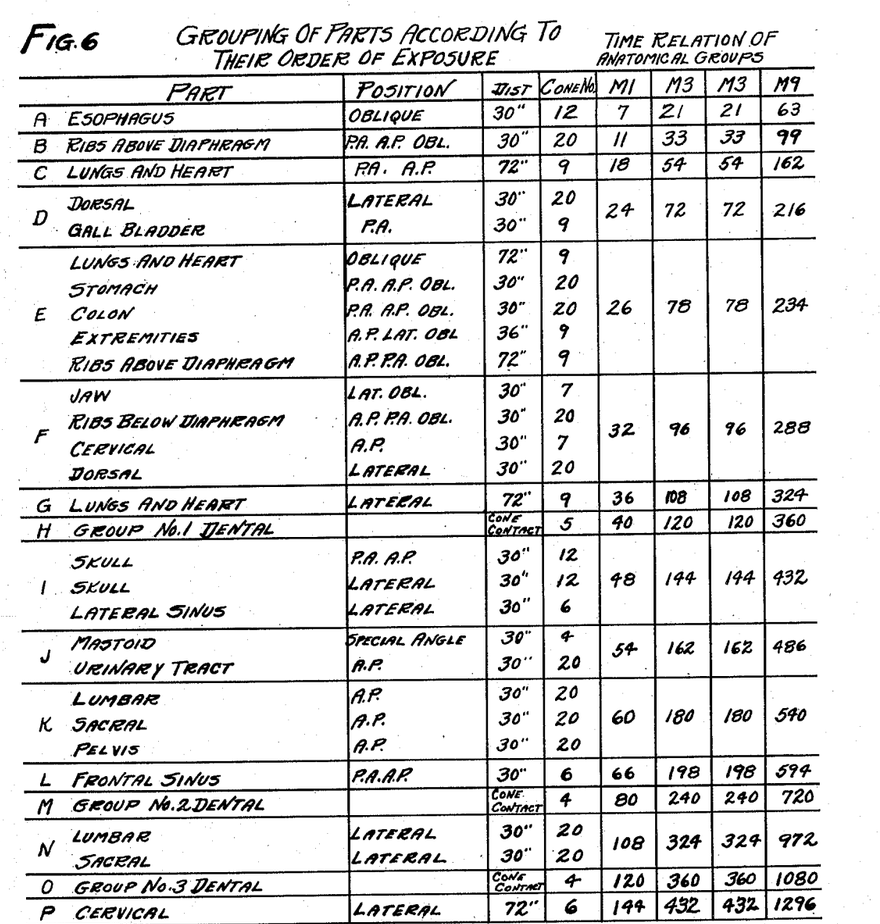
Fig. 6 is a table of 16 groups of anatomical parts arranged according to physical densities.

In further explanation of Fig. 4, it will be seen that I have divided human anatomical parts into sixteen classes according to their relative physical density. Figure 6 is a table showing such classes in the order of their radiographic densities. From this table I have by rearrangement, derived the classification shown on Fig. 4 in which parts have been arranged not in the order of their physical density or X-ray time required, but according to their occurrence from the head to the foot of the subject. The sole exceptions to this classification are the teeth, which come last. I have determined milliampere seconds for each group at a constant exposure distance listed under "Dist." in Figs. 4 and 6. This is the tube target to film distance. Variations from the standard distance can of course, be allowed for by increasing the energy of the X-ray tube in direct proportion to the ratio of the squares of the distances. In Fig. 4 is seen lever 10 which may be moved to various positions thru slot 11 opposite a table 9 on which are lettered the names of parts and groups of parts; this lever governs the timer circuit and regulates the length of exposure.

Figure 2:
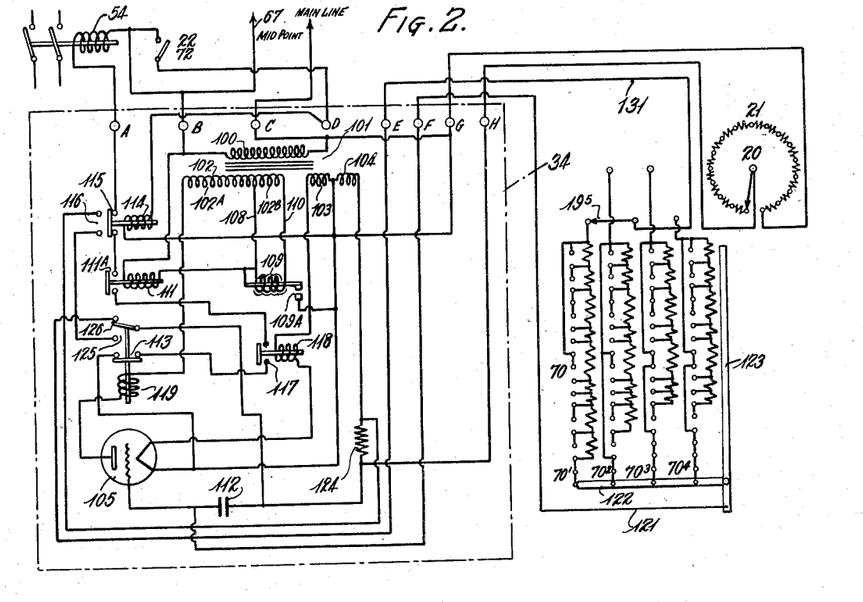
Fig. 2 is a schematic representation of the timer circuit and its relation to other circuits.

My machine is unique in that it has a timer circuit shown in Fig. 2, which, besides governing automatically the time of exposure, as selected, makes it impossible to injure the X-ray tube by selecting too long a time of exposure at a voltage above a critical value. The provision of such a timer in relation to the other circuits of the machine is one of the objects of the invention.

In Fig. 6, the four last columns are devoted to a listing of the time relation of the anatomical groups. The unit in which the time is expressed is the number of alternations of a 60 cycle current, it being assumed that the entire apparatus will be fed by 60 cycle current. If 25 cycle were used, the total length of exposure in seconds would be the same as their absolute time value. The headings M1, M3, M3 and M9 at the heads of the columns indicate what multiple one set of figures is of the other set. Thus an M3 figure is three times the corresponding M1 figure.

The abbreviations used in the "position" column of Figs. 4 and 6 are well known to radiographers and require no explanation.

Figure 3:
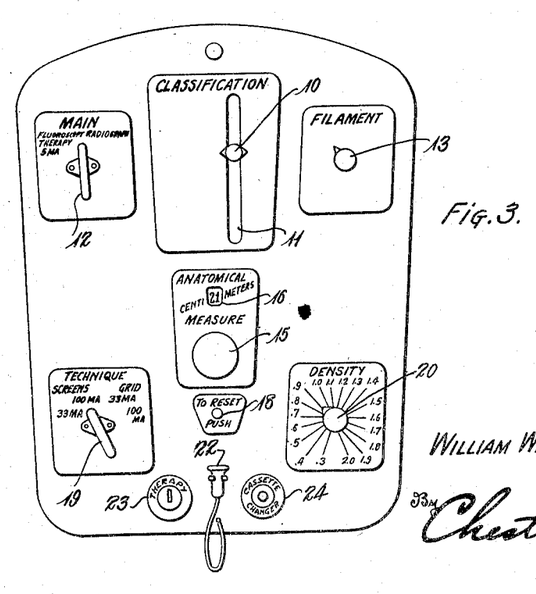
Fig. 3 is a plan view of the control board of the apparatus.

The circuit drawings can now be again discussed with a better appreciation of the objectives of the invention. In Fig. 3, 12 is the main switch of the machine; turned with its pointer to to left, the machine is adapted for fluoroscopy and therapy, the current being limited to 5 milliamperes thru the tube. Turned to the right there is no such limitation hence the setting is proper for radiography. Switch 12 is shown in the upper right hand corner of Fig. 1. On the right of Fig. 3 in the upper corner is a filament milliamperage control knob 13 which also appears in Fig. 1 as a variable resistance. Classification control, already preliminarily discussed, lies between the filament control and main switch.

Of the classification table on the machine itself, it is to be observed that it divides the human anatomy into eight groups of members; that some of these members are also listed according to the position in which they are to be radiographed and that the distance from the tube and the milliamperes to be employed are accurately prescribed.

The plate to the right hand of slot 11 bears information in two columns giving the grid setting in case of use of the "Bucky" diaphragm and also gives the number of cone to be used.

Below the classification table on the control board is a dial knob 15 and window 16 by the use of which an adjustment of voltage in accordance with the thickness of the individual anatomical parts can be made, this adjustment following the average equation previously given. The knob 15 controls contact of the voltage regulating circuit with the various taps of the auto transformer 17 shown in Fig. 1. The knob also carries a circular card bearing an ascending scale of numbers, which appear successively under the window 16 as the knob is turned. Immediately below the knob 15 on the board is the relay 18 controlling the X-ray tube circuit. To the left of relay 18 is a technique switch 19 which is rotatable thru four positions which bear indicia as shown. The two left hand divisions are for the use of intensifying screens and the two right hand ones are used when a Potter-Bucky diaphragm is employed. Settings of 33 MA and 100 MA are provided under each head. Among the differences of the two sides of the circuit is that the Bucky side is arranged to give longer exposures automatically.

On the right side of relay 18 is a rheostat control 20 entitled "Density", the function of which is to control a variable resistance 21, (Fig. 1) which in turn regulates the time of exposure in multiples of a standard time. The standard time is an arbitrary figure but not a fixed one and is determined by the combination of the settings of classification lever 10 and technique switch 19. Density control 20 provides factors ranging from 0.3 to 2.0 by which this standard time may be multiplied to care for special patients, for instance, children or old people, or other desires of the operator.

Below the relay on the board is found exposure button switch 22 which can be identified in Fig. 1. To the left of 22 is a therapy contact switch 23 the function of which is actually to control the current on or off after the machine has been set for therapy by moving switch 12 to therapy position. To the right of button switch 22 is a cassette changer button switch 24 which is adapted to close the circuit of an electromagnet (not shown) on a remote cassette changer.

The operation of radiographing a patient with this machine will now be described, following which the circuits will be traced and their influences explained, and finally their behavior under current in operation.

The steps of radiography are, in detail—

1. The patient is placed in proper position, the distance from the tube is measured and the angle checked. The proper cone for diaphragming is fitted to the tube as per directions on classification plate.

2. The depth of the part to be radiographed is taken with a measuring stick and the auto transformer regulator 15 is set to this depth.

3. The main switch is thrown to the radiographic side.

4. The filament regulator 13 is properly adjusted for the characteristics of the particular X-ray tube in use.

5. Lever 10 is moved opposite the name of part and kind of view to be taken, which has its appropriate position on the classification plate.

6. The technique selector is set on the desired milliamperage for use of screens or Bucky diaphragm. This switch, besides altering the timer circuit for the desired milliamperage for the use of screens or Bucky diaphragm, also changes automatically thru the Coolidge filament regulator taps, the proper milliamperage for 33 and 100 MA. It also adds sufficient voltage to the secondary regulation of the auto transformer to compensate for the drop due to the increase in current employed.

7. The multiplier known as "Density control 20" is set on 1.00 unless greater or less density is required for some special reason. Density control may be employed to compensate for smaller than normal cone fields. For instance, correction on 20 inch pelvic field to 4 inch field can be made by advancing density control to 1.5.

8. Exposure switch 22 is employed for timing and to keep thumb on the button until the exposure is complete. Altho after the proper interval the exposure is stopped automatically, still, removal of the thumb from the button before that time stops the exposure. In this way protection is achieved since the main oil-magnetic switch, in the X-ray transformer primary may be opened at will.

If the Potter-Bucky diaphragm is to be used, Bucky operation limit, which is slightly above exposure time, is set according to the table which is imprinted on the classification table under the head of "Grid setting." The Bucky is now cocked by pulling out the Bucky rod. If technique switch 19 is on the "grid" side, no exposure can be obtained by pressing button 22 unless the Bucky is cocked. When the Bucky is set, the exposure button 22 is pushed and held down throughout the exposure. Release of pressure stops the exposure.

Figure 1:
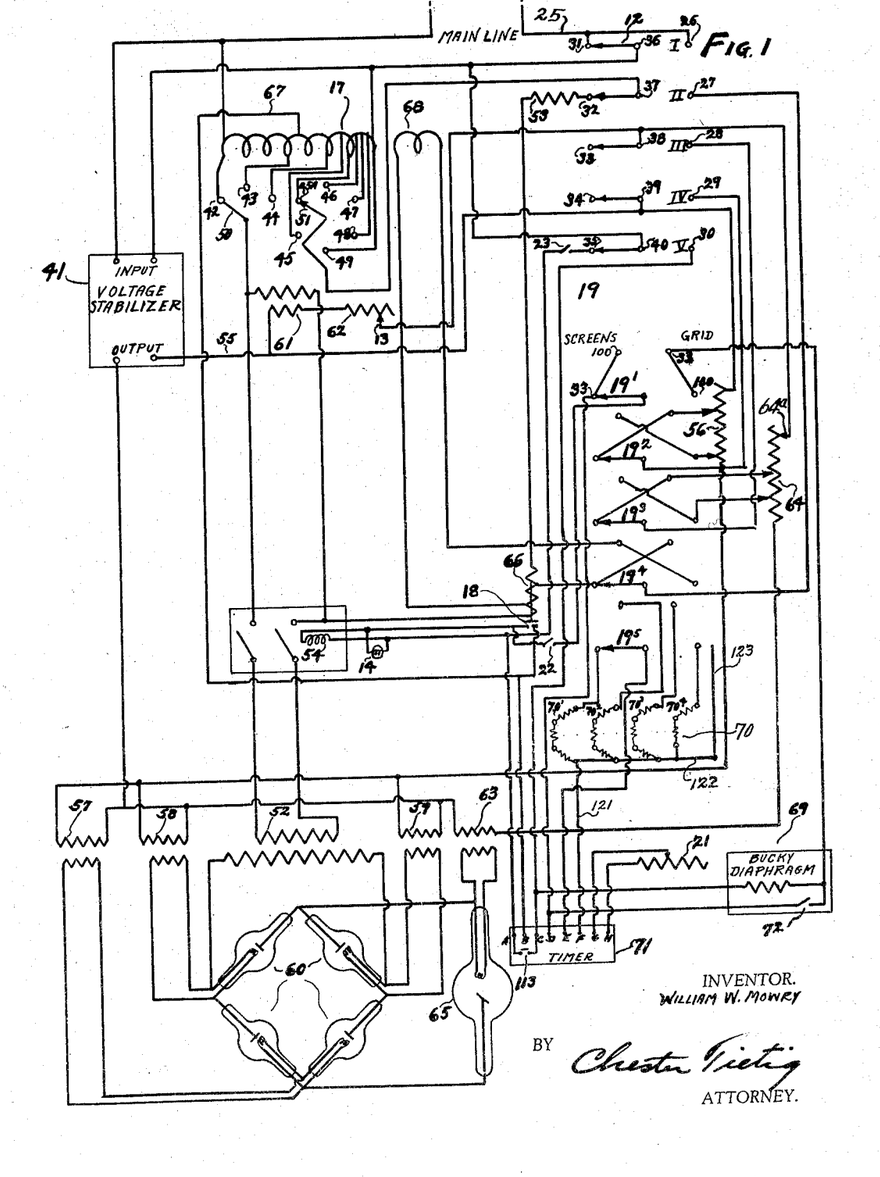
Fig. 1 is a schematic representation of the complete electric circuits.

Reference is now had to Fig. 1 in which 25 represents a main line of say 220 volts, 60 cycles, and one phase. Wide latitude is permissible here however, since any competent X-ray engineer can design this apparatus after this disclosure, to operate on different current. The left arm of the line is run to a voltage stabilizer 41, which may be omitted if the main line voltage is stable. The right hand side is run to two contacts 31 and 26 of a five pole, double throw switch. The switch has two sets of five terminals, the right side being 26, 27, 28, 29 and 30 while the left side is designated 31, 32, 33, 34 and 35. Actually the contacts 33 and 34 are not used and may be omitted, but the reason for using the five pole double throw switch is that it is the most nearly suitable commercial form of switch for the purpose. These two rows of contacts may be alternately connected to a middle row 36, 37, 38, 39 and 40, by a double-throw five-deck switch 12 which is the main switch and selectes between the radiographic setting or the fluoroscopy and therapy setting. The switch is shown in the fluoroscopy and therapy position. The upper deck designated as I connects the main line 25 to the auto transformer 17 thru 31 or 26 and to the voltage stabilizer 41. Auto transformer 17 has nine taps 42, 43, 44, 45, 45a, 46, 47, 48 and 49, the first three of which are major voltage selection steps for the primary of the high tension transformer 52 while the last six are minor steps. Switches 50 and 51 are arms of the same dial switch 15 (Fig. 3), 50 having the function of selecting steps in 5 volt multiples while 51 rotates approximately five times for every tap change accomplished by 50, so that 51 selects steps of say one volt difference. This arrangement is necessary so that the voltage can be increased by uniform steps. The taps connected to switch 50 are large voltage steps and those connected to switch 51 are small voltage steps. The single knob 15 moves the switch arm 51 and after each revolution thereof, 50 is advanced one step by a Geneva movement (not shown).

In the second deck designated as II, 37 and cooperating blade of switch 12 connect a ballast resistance 53 and the entire winding of the relay 18 into the primary circuit. The closing of this circuit depends upon the closing of a magnetic switch 54 which completes the circuit to high tension transformer 52.

In the third deck designated as III, 38 and corresponding blade of switch 12 control the current supply to the X-ray filament transformer. It is taken from stabilizer 41 thru lead 55 to the primary of a compensating transformer 61 and thru a variable resistance 62, both of which are in series with an X-ray tube filament transformer 63 thru the intermediary of a variable resistance 64. The primary of a compensating transformer 61 is connected to the primary circuit studs of the magnetic switch 54 and the design of the transformer is such that as the voltage of auto transformer is increased, the secondary coil bucks out or reduces the voltage to the filament circuit so as to compensate for the saturation effect of the X-ray tube 65 and thereby maintain the milliamperes constant. The transformer 61 is connected so that its voltage output subtracts from the voltage supplied to the filament circuit by a stabilizer 41. This causes the filament current to be reduced when the switches 50 and 51 increase the voltage input and hence the voltage output of the rectifier. One end of the primary winding of transformer 61 is connected to dial switch 50 while the other end connects to 51 via 66, 19⁴, 27, 37, 51 or 66, 53, 32, 37, 51. The secondary winding of the transformer is connected in series with the X-ray filament transformer. The bucking or opposed connection used has the effect of bringing about power transfer from the stabilizer to the auto-transformer. Unless the transformer were so coupled, the electron current through the X-ray tube would be less at 25 kv. for instance due to space charge effect than at higher voltages. Variable resistor 62 is used to make small adjustments in filament current when different tubes are used, and the upper contact 64a on variable resistance 64 is semi-permanently set to give 5 MA high tension current in the X-ray tube 65.

In the fourth deck designated as IV, 39 and cooperating blade of switch 12 control the energy for the filament circuits, which is supplied by the voltage stabilizer 41. It is delivered by a lead 55 to a variable resistance 56, the upper contact of which is adjustable to a suitable value of 5 MA on the fluoroscopic setting. Resistance 56 is in series with the primaries of valve filament transformers, 57, 58 and 59. The secondaries of these transformers connect to the filaments of the valve tube rectifiers 60.

In the fifth or lowest deck designated as V, 40 and the corresponding blade of the main switch 12 connect the main line 25 to an X-ray switch 23 which is adapted to energize the operating coil of the magnetc switch 54. The other terminal of the operating coil connects by overload relay contacts 66 to a tap 67 on the auto transformer 17. For fluoroscopic or treatment work, the X-rays are generated by closing switch 23. In the event of an overload, the relay 18 operates, breaking the circuit of the operating coil of magnetic switch 54, which disconnects the primary of transformer 52.

Radiographic adaptations

For radiography, main switch 12 is turned to a position opposite to that shown in Fig. 1. In the first deck designated as I, 26 connects the apparatus to main line 25 as before. In the second deck II, 27 connects the auto transformer switch 15, 50, 51 to technique switch 19, which is a five deck, four pole switch. It is to the fourth or lowest deck 19⁴ that the switch designated generally by 15 is connected. It is to be here observed that the various decks of switch 19 are designated 19¹, 19², 19³ and 19⁴ in descending order. The techniques which have been selected for use with the apparatus are 33 or 100 MA with screens or 33 or 100 MA with Bucky diaphragm. Fig. 1 shows the technique switch 19 on a 33 MA screen position. By means of the fourth pole of the fourth deck, dial switch 15 is connected to a tap of the relay 18 for 33 MA or to a voltage addition coil 68 on the auto transformer.

The voltage addition coil has the proper number of turns to make the kilovoltage of the high tension output the same for 100 as for 33 MA.

In the third deck designated III, 28 of the main switch connects the X-ray filament transformer circuit to the third deck 19³ of the technique switch, which permits the latter to short out different portions of the resistance 64, thereby adjusting the X-ray filament current to the proper value for 33 or 100 MA emission. In a similar manner, in the fourth deck IV, 29 of the main switch connects stabilizer output lead 55 to the second deck 19² of the technique switch, permitting it to short out sections of the resistor 56, which increases the valve filament temperatures to the operating points for 33 or 100 MA technique.

In the fifth deck V, 30 of the main switch connects one side of the main line to the timer 71. The tap 67 on auto transformer 17 is also connected to the timer 71 and such connections furnish energy to the latter. The upper deck 19¹ of the technique switch connects the exposure switch 22 either directly to the timer for screens or to the Bucky diaphragm 72. During radiography with 33 MA or 100 MA screen technique the switch 22 connects to the exposure trip circuit D on the timer through 19'. During either 33 MA or 100 MA grid (Bucky) technique, 19' connects 22 to the grid (designated "Bucky diaphragm") and to the grid exposure switch 72, completing the circuit to D on the timer.

The fifth deck 19⁵ of the technique switch selects between the four resistor banks 70¹, 70², 70³, and 70⁴ on resistor unit 70, also called multiple time rack, which acts as the discharge resistor of the timer 71, which determines the standard time. The positions of the switch 10 which regulate the resistor 70 are marked to correspond to the parts of the human body and the dial switches 15, 50, 51 are marked to correspond to the thickness of the part to be radiographed as shown by indicating dial 16. The handle 10, shown in Fig. 3, is adapted to move slider 122 (Figs. 2 and 7) to selected points on the resistor bank 70 (Figs. 2 and 7) as shown in Fig. 2. Its operation is described hereinafter under the heading "Multiple time rack." The variable resistance 70 is so arranged that known multiples of the standard time may be obtained for special uses. See Fig. 7 for the circuits of this unit and the following paragraphs for its description.

Multiple time rack

Figure 7:
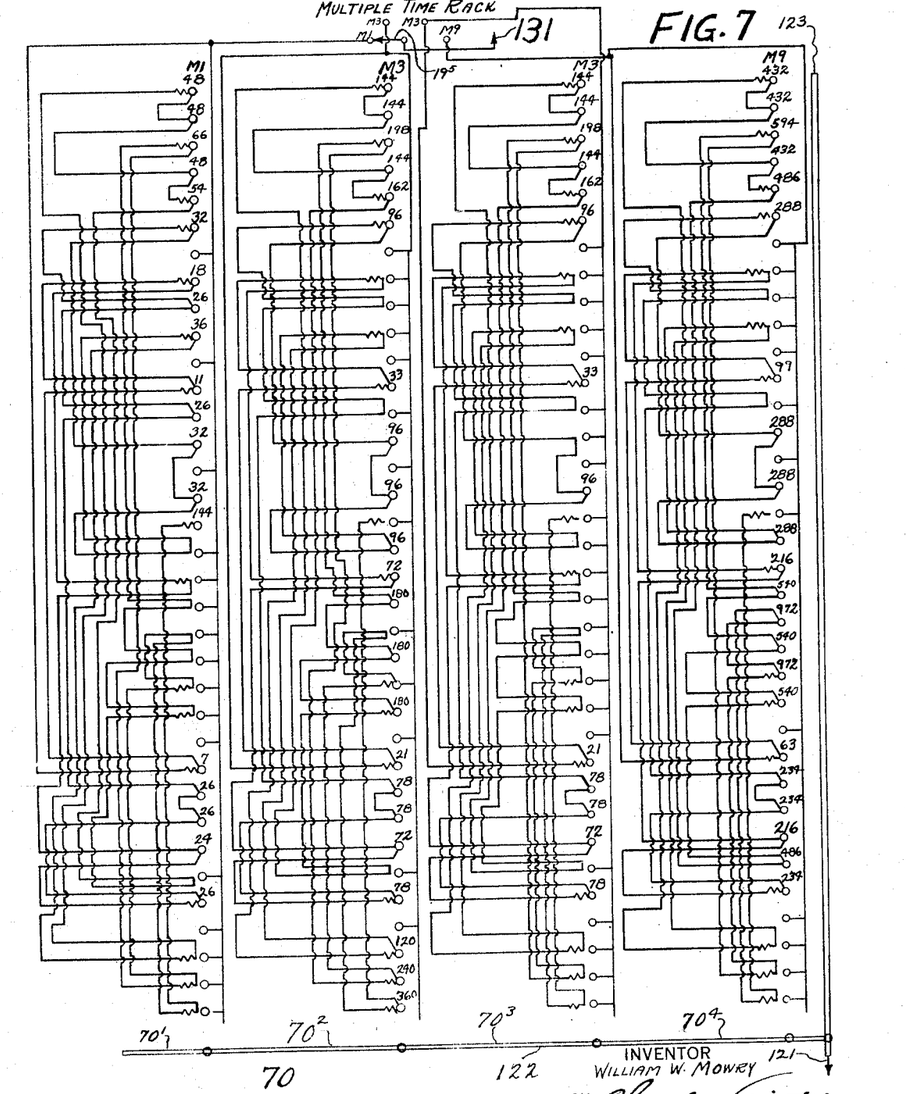
Fig. 7 is a diagrammatic showing of a bank of timing resistors which I designate as a "multiple time rack."

Referring now to Fig. 7, this view shows an enlarged diagrammatic scheme of the timing resistor circuits which are employed in connection with the timer. The entire bank is designated by 70, while the four individual banks which make up the unit are 70¹, 70², 70³, and 70⁴. Respectively, they are also designated M1, M3, M3, and M9, these figures giving the respective time values to which the resistances correspond. M3 is three times as long as M1, while M9 is three times as long as M3 as to each and every contact thereon except those which are shorted out for various reasons. Such reasons may be that the tecknique selected is not the best radiographic procedure or may injure the X-ray tube.

The points or contacts across which the condenser 112 discharges are designated 131 and 121 on Fig. 7. The small figures immediately above the contacts in rows M1, M3, M3, and M9 indicate the time value of the resistor connected to that particular contact in terms of the number of alternations of 60 cycle current which occur during the condenser discharge thru that resistor. It will be observed that the figures in the three last rows are multiples of the corresponding values of the first row in the ratio which is indicated by the designation M3 or M9.

It will be observed that the contacts which are not marked with numbers are not connected to the resistors at all, but to switch-lever 19⁵ and then to contact 121, thereby short circuiting condenser 112 thru resistors for timing or direct short for blocking the exposure. If the technique or exposure for which the apparatus is set is not useful and is harmful to the tube, this arrangement prevents any high voltage-time combination from injuring the X-ray tube by creating an extremely fast condenser discharge with only instantaneous generation of X-rays. A contactor 122 is slidable over the entire face of the resistor bank, bridging four contacts at once back to condenser discharge lead, 121. Only one of the four contacts bridged, at once, however, has any time determining value. That is to say that there is no return to three of the four contacts bridged. This action is controlled by the deck 19⁵ of the technique switch. This is because 19⁵ has the choice of four positions and each one of them is a resistor bank either 70¹, 70², 70³, or 70⁴. One of the condenser discharge leads 121 is connected to one terminal of the rack 70 so that the condenser cannot discharge except thru the contacts of one of the said resistor banks. One end of the rider or bridging contactor 122 is at all times in contact with a common return 123 which lies parallel to the resistor banks.

The manner of connection of the multiple time rack to the remainder of the X-ray circuits may be seen from the fact that the contacts at the top of Fig. 7 immediately under the legend, these contacts being marked M1, M2, M3 and M9 are the contacts wiped by deck 19⁵ of the technique switch and that 31, also under the legend, is one pole of the main line.

Figure 7 shows the timer resistance banks in detail. There are four resistance banks each of the same general design. To the right of each is a wire which connects directly to a button on the technique selector 19⁵. All buttons which are not to be used for any reason are connected to this wire and therefore when the slider 122 is set on that button the timing or discharge resistors are short circuited allowing instantaneous discharge of the condenser. Reasons for having a button shorted out are that the technique represented by that button is not suitable—for example, 33 MA is not suitable for chests—or because the time kv. MA second combination would ruin the X-ray tube, such for example, as radiographing lumbar spine with 100 MA with a Bucky diaphragm. The part generally runs so thick that too high a kv. would be used so that MA seconds at 100 MA would ruin the target. The other buttons connect at various points in a long series of resistances, one end of which connects to the button 19⁵. Buttons which are for the same time in a given bank are connected together and to the same point in the series of resistance. The numbers opposite the buttons indicate the duration of exposure in number of half cycles at 60 cycles per second when unity density is used.

It is evident therefore, that a predetermined technique has been provided which tends toward the best radiographic practice, definitely prevents bad techniques and invariably protects against injuries to the tube by preventing techniques above the energy value of the X-ray tube focus, employed. This is to say that the apparatus provides a kilo-voltage vs. thickness of body part technique for obtaining proper penetration of the X-ray beam. It also provides a timer which will give definite times for each body part so as to obtain proper blackening of the X-ray film. The time intervals are properly pre-determined so that none of them will exceed the safe rating of the X-ray tube.

*Density control*

The density control 20 previously mentioned comprises a variable resistor 21 placed in the charging side of the timing condenser circuit. More accurately stated, it is in one of the dividing circuits of the charging side. The lower the resistance value in such circuit, the longer will be the resultant period of X-ray generation. The density relation governed by this control may vary in respect to normal time from 0.3 to 2.00.
By "normal time" is meant any particular time which is a function of a particular discharge resistor in the anatomical classifier. The density control 20 varies the normal density of radiographic result along a scale 9 on the control board of the apparatus, this scale being calibrated in percentage reference (fractions expressed in tenths) to discharge resistor times.

Besides the function in compensating for the heavier radiographic shadows of children and old people, already mentioned, the density control offers a means of measuring the degree of bone changes over a long period of time. If the settings of the apparatus are marked on the original film, subsequent films taken much later can show how much adjustment of the density control was necessary to get an equivalent radiographic result. This change of setting is an exact measure of the bone change.

*Timer adaptations*

The timing circuit of the X-ray apparatus shown in Fig. 2 functions to energize for a predetermined interval the operating coil of magnetic switch 54 included in the primary circuit of the X-ray transformer. Control of the timing function is achieved by use of a grid-controlled three element tube 105 placed in a circuit containing a plurality of relays and a condenser 112 adapted to discharge through the control electrode circuit of the tube thereby rendering the tube non-conductive for a predetermined and definite period of discharge. When the tube circuit is rendered non-conductive a relay circuit is energized which results in completing an energizing circuit to the magnetic switch 54 thus closing the primary circuit of the tube transformer. This operation is better understood by reference to Figure 2 which discloses a complete wiring diagram of the timer circuit which was conveniently indicated at 71 in Figure 1. In this figure there are shown a series of eight taps or terminals A, B, C, D, E, F, G, and H, which together form the connecting terminals by which the timer is placed in circuit with the X-ray apparatus. The circuits to which each of these terminals are connected are as follows:

A—Magnet coil of switch in tube transformer primary
B—Main line
C—Main line
D—Starter switches
E—Condenser discharge circuit
F—Condenser discharge circuit
G—Condenser charge circuit
H—Condenser charge circuit In Figure 2 of the drawings 101 represents a transformer having a primary winding 100 which is energized by connection across one side of the main line and the mid-point 67 of the autotransformer 17. Transformer 101 is provided with a plurality of secondary windings 102, 103 and 104. Winding 102 is divided into two parts 102A and 102B by a tap and lead connection 108. The portion of secondary winding 102 designated as 102A supplies potential across plate circuit of the three element grid controlled tube containing mercury shown at 105. This circuit passes from one side of winding 102 through the coil of relay 119 to the plate element or anode of the tube. The tap connection 108 of winding 102 is connected through the contact 109A of a thermal relay 109 to the filament circuit of tube 105 thus completing plate potential circuit when the aforesaid contact 109A has been closed due to the heating effect within relay 109. A portion of secondary winding 102 designated 102B is connected directly across the heating element of thermal relay 109 by leads 108 and 110 and supplies energy to affect heating of the bi-metallic member in order to cause it to close contact 109A. The operation of thermal relay 109 functions to introduce a time delay interval the purpose of which will be explained more fully in conjunction with other parts of the circuit. Secondary winding 103 is connected across the filament of tube 105 and in series with relay 118 so that the relay will be energized to close its contacts 117 when the filament circuit is closed and conversely will be de-energized upon an opening of the filament circuit such as would occur upon failure of the tube filament. Secondary winding 104 is connected to maintain a potential across the grid circuit of tube 105 and has a resistor 124 and condenser 112 placed in series therewith for a purpose to be described later.

In addition to the circuits and devices described above, the timing circuit contains relays 119, 114 and 111. As stated, the control coil of relay 119 is located in series in the tube plate circuit and when de-energized, the contacts 113 are closed, contact 125 is open and contact 126 is closed. Relay 114 which may be termed the starting relay is connected across the source of the primary winding 100 and in series with the starter switches 22—72 which serve to close the circuit energizing relay 114. As is shown in Fig. 1, when the Bucky diaphragm is placed in the circuit by throwing rack 19' of switch 19 to "grid" side, starter switch 22 and Bucky starter switch 72 are placed in series so that switch 22 must be closed in addition to switch 72 (which is automaticaly closed by the Bucky diaphragm mechanism) in order to complete the energizing circuit of relay 114.

Contacts 116 of starting relay 114 are normally closed and upon energization of the relay, contacts 116 are opened and contacts 115 are closed. Contacts 116 serve when closed to place a shunt across resistance 124 located in the grid circuit.

Relay 111 which may be termed a safety relay has contacts 111A which are closed upon energization of the relay coil. The operation of safety relay 111 is controlled by thermal relay 109 so that relay 111 is energized only after the bimetallic strip of relay 109 has been heated sufficiently to close contact 109A to form a closed circuit from terminal B through coil of relay 111, contact 109A to terminal C.

A variable resistance designated as density control 20 is connected to terminals G and H and as shown in Figure 2, terminals G and H are connected to each side of the grid circuit so that density control 20 is at all times connected directly across the grid circuit. A variable resistance designated as time rack 70 is connected to terminals E and F. Within the timer circuit terminal F is connected to one side of condenser 112 and terminal E is connected through contact 126 of relay 119 to the opposite side thus affecting a leakage path around the condenser when contact 126 is closed.

Having described the relays and other devices and circuits in which they are positioned, the operation of the timing circuit is as follows:

Prior to the time the actual radiographic exposure is to be made, auto-transformer 17 is connected to a source of potential by throwing switch 12 to the "radiography" position. A potential is thus impressed across terminals B and C of the timing circuit which energizes primary winding 100 of transformer 101. Voltages induced in secondaries 102, 103 and 104 serve to condition the timing circuit pending the closure of starting switches 22—72 for initiating the exposure period. The potential induced in portion 102A of winding 102 constitutes the plate or anode voltage of tube 105 and is applied across the plate-filament upon the closing of contact 109A controlled by thermal relay 109 as described above. Contacts 109A close after a time interval has elapsed during which the condenser is charged in the manner described later. The voltage induced in 103 is impressed across the filament of tube 105 which causes it to become heated and the resulting current passing through 118 causes the armature to pick up to close contacts 117. The voltage induced in 104 is impressed upon condenser 112 and the grid of tube 105 and since the voltage impressed on the grid exceeds the critical-grid-voltage characteristic of the tube for each instantaneous value of plate voltage, tube 105 becomes conductive during alternate half cycles of the alternating current wave.

When tube 105 becomes conductive, a current flows in the plate circuit causing the coil of relay 119 to be energized which opens contacts 113, closes contact 125 and opens contact 126 (operated position from that shown in Fig. 2). Closing of contact 125 places a shunt across resistance 124, the circuit passing through contacts 116 which are closed when the coil of relay 114 is de-energized as it is prior to initiation of the exposure period. Shunting 124 increases the relative voltage drop across the grid circuit including condenser 112 and due to the component of this voltage which is impressed across the condenser, it receives a charge during the conductive periods of the tube which increases in increments during each half cycle until a maximum measure of energy is stored which is limited by the constants of the circuit. The timing circuit is ready to time a radiographic exposure when the condenser has been charged to the maximum measure of energy storage in the manner described.

When it is desired to make the exposure, switch 22 or switches 22 and 72 are closed as explained above causing the coil of relay 114 to be energized through terminals C and D which results in the closure of contacts 115 and opening of contacts 116 which condition is shown in Fig. 2. Switch 22 or 22 and 72 must be maintained closed throughout the exposure period to insure the continued energization of relay 114. The opening of contacts 116 removes the shunt from resistance 124 which has the effect of decreasing the effective potential applied to the grid circuit since an appreciable voltage drop occurs across the resistance 124 thus reducing the relative drop occurring across the grid of tube 105. The constants of the grid circuit are adjusted so that when the condenser is charged, the biasing voltage applied to the grid of the tube when a voltage drop exists across 124 is negative in respect to the critical-grid-voltage characteristic of the tube for each corresponding instantaneous value of plate voltage.

Tube 105 is thus rendered non-conductive which results in the de-energization of coil 119 so that contacts 113 and contact 126 are closed and contact 125 is opened. Closure of contacts 113 serves to close a circuit to the coil of switch 54 passing from terminal A through contacts 115, contacts 111A, contacts 117, contacts 113, to terminal C and as long as this circuit is maintained, magnetic switch 54 will remain closed causing the X-ray transformer primary 52 to be energized.

Closure of contact 126 by the operation of relay 119 places a discharge resistance designated as time rack 70 in parallel with the condenser 112 through terminals E and F. The rate of discharge is controlled by the value of resistance in the leakage path through time rack 70 and when the voltage of the condenser has been decreased to the point where the resultant condenser and grid voltages are equal to or more positive than the critical-grid-characteristic voltage of the tube for the corresponding instantaneous value of plate voltage, the tube will again become conductive causing relay 119 to take the position described above, thus shunting resistance 124, allowing the condenser to be recharged and recycling of the entire relay sequence.

It is seen that the duration of the exposure period is determined by the time of discharge of the condenser 112 which is a function of the value of resistance in the time rack 70. Density control 20 serves to vary the potential existing across the grid circuit and accordingly may be used to increase or decrease the relative measure of condenser charge and period of discharge, thus altering all of the timing intervals obtainable on the different buttons of multiple time rack 70 by a constant factor. The switch 19⁵ and slider 122 in conjunction select a resistance to be applied between studs E and F. Combinations of 19⁵ and 122 which represent a technique that would overload the tube have been made inoperative by providing a short circuit for that particular contact so that condenser 112 discharges nearly instantaneously and no exposure or a very short exposure is made.

The above paragraph indicates how the timer is connected with the circuits of the X-ray apparatus. The basic construction and theory of operation of the timer itself is given in United States Patent No. 1,867,225, upon which United States Patent No. 1,892,017 is an improvement. It is the timer of the latter patent which is employed in this apparatus.

Operation for fluoroscopy

Assuming that the machine is to be used for fluoroscopy or therapy, the main switch 12 is turned in the direction indicated. Then the main line is connected by 31, 36 to auto-transformer 17 and stabilizer 41. The voltage to be employed is determined by moving dial switches 50 and 51 which are marked in centimeters thickness of part. One side of the circuit supplying energy to the X-ray transformer leads from minor step switch 51, through 37 and 32 to relay coil 66 and then to an input terminal of the magnetic contactor. The ballast resistance 16 is in series for protection of the X-ray tube and the total winding of the relay 66 is in series for protection against accidental short circuits. The dial switch 50 connects directly to the other contact.

The stabilizer output of 41 supplies current by lead 55, and voltage compensating transformer 61 and variable resistance 62 and all of the semi-variable resistance 64 to the primary winding of the filament transformer 63. The stabilizer also supplies current by lead 55 thru all of the semi-variable resistor 56 to the primaries of the valve filament transformers 57, 58, 59.

The primary of voltage compensating transformer 61 is connected to the contacts of the magnet switch. The function of this transformer is that as the high tension voltage applied to the X-ray tube is increased the filament current is decreased so as to hold the current supplied by the high tension a constant. The resistance 64 gives an approximate adjustment of the filament current and resistance 62 is adjusted to secure the current exactly.

To energize the X-ray tube with high tension current, switch 23 is closed. This completes the circuit from the main line thru 31, 36, 40, 35, 23 to the magnetic switch operating coil 54, also pilot lamp 14 and thence thru relay contacts 18 to a tap on the auto-transformer at 67. The magnetic switch closes and pilot light 14 lights to indicate that the switch is closed. The primary of the high tension transformer 52 is now energized from the auto-transformer 17. The connections are 51, 37, 32 ballast resistance 53, relay coil 66, magnetic contactor whose holding coil is 54, to the primary of the high tension transformer 52 and thence by the magnetic contactor to 50 to 42. The output of the high voltage transformer 52 is rectified by the four valves 60 in a standard bridge circuit and is supplied across the anode and cathode of the X-ray tube 65. In the event of a short circuit or overload of the high tension transformer the excess current causes the relay 66 to open contacts 18 thereby deenergizing the pilot lamp 14 and the holding coil of the magnetic contactor 54 which opens the magnetic contactor breaking the current to the high tension transformer 52.

Operation for radiography

For use in radiography the main switch 12 is turned to the right in the position opposite that in which the contacts are shown. The main line is connected to the auto-transformer 17 and stabilizer 41 by 26, 36. The rider or bridging contactor 122 is then moved to the proper position corresponding to the name of the part of the body being X-rayed, this corresponding to knob 10 in Figs. 3 and 4 and the name plate opposite the name of the part indicates the position to which switch 19 is to be thrown. Let us assume it to be 33 MA screens as the switch is shown in that position in Fig. 3. The valve filaments are energized by the following: circuit stabilizer 41, 55, 39, 29, 19² to the second tap on 56 to 57, 58, 59 and back to the stabilizer output. The X-ray filament is energized by the following circuit 55, 61, 62, 38, 28, 19³ to the second tap on 64 to 63 and back to stabilizer output. Auto-transformer 17 feeds high tension transformer 52 by the circuit 51, 37, 27, 19⁴ to tap on relay 66 to magnet switch 54 and when closed to 52 back to magnet switch and to 50 to 42. The tap on 56 and 64 adjusts the valve and X-ray tube filaments to the proper valve for 33 milliampere high tension current. The timer circuit EF is connected to the proper resistance bank of 70 by 19⁵. The connection now is E, 19⁵, 70′ F. The density control is set to the density desired by adjusting the variable resistance 21 which is located in circuit G—H. The density control serves to adjust the exposure time by increasing or decreasing the relative exposure time corresponding to the settings of resistance 70 in the E—F circuit by a predetermined factor. The percentage of increased or decreased time is a function of the amount of resistance in the charging circuit of condenser 112 and this resistance is varied by density control 20. Now when resistance 21 is changed the time for all the buttons on 70 is changed by a factor.

The function of the timer is to close 113 for a definite time according to the adjustment of 70 and 21. When this occurs the circuit to the holding coil of magnet switch 54 is as follows: Main line 26, 36, 40, 30, C, 113, A, 14, 54, 18, 67. The timing is started by closing the circuit BD. The stopping is automatic. The starting circuit is: B 18 22 19′ D. Operation is as follows: Turn main switch to radiography, adjust 70 to part to be radiographed, set 21 to film density desired, set 50 and 51 to thickness of the part of the patient, adjust 62 if necessary. Press button 22 and hold until lamp 14 goes out.

Assume technique switch 19 set to grid 100 then 56 and 64 are set to other taps corresponding to 100 MA. The circuit from the auto-transformer to the HT transformer is as follows: 51, 37, 27, 19⁴, 68, 18, 54, 52, 50, 42. Transformer booster 68 is introduced in the circuit to boost the input voltage to the H. T. transformer an amount equal to its voltage drop at 100 MA.

When switch 22 is depressed it closes the circuit to the magnet of the Bucky diaphragm now 38. This connection follows: Main line 26, 36, 40, 30, 19', 22, 18, 67. When the Bucky starts in motion it closes 72 making the start circuit of the timer BD. Circuit follows D, 72, 19', 22, 18, B. 22 is depressed until lamp 14 goes out.

Among the variations which may be incorporated into my apparatus or omitted therefrom, without departing from the spirit of the invention, I list the following:

1. Omission of the stabilizer if a stable main line is available.

2. Addition of a voltage compensator placed in one leg of the auto-transformer primary feed circuit. This is a multiple switch and may be an extension of minor steps on the auto-transformer secondary and may have a lever contactor which is fed by one side of the 220 volt line.

3. Timing condenser 112 may be made a variable one so that the entire scale of timing may be varied by varying the condenser. Such an adjustment would be of value in compensating for changes in the speed of films or screens over a period of years in case other processes of manufacture made permanent changes in the speed of such articles.

The term "integrating" as used throughout this application means automatically obtaining a definite and uniform amount of energy capable of affecting a photographic film from the various manual settings provided for on the front panel of the apparatus and the automatic timing mechanism behind it. In other words, the apparatus utilizes the electrical values created by the various manual settings to select automatically a time which will generate at a selected voltage an amount of X-ray energy which after it has passed thru the variable obstacle represented by the patient, will have left as a residue a uniform (or integrated) energy which always has the same effect upon a photographic film of standard properties, uniformly placed. The shortest feasible definition of "integrating" therefore is balancing electrical values algebraically to obtain a uniform and predetermined energy value as a residue. By adjusting the anatomical selector 10 a basic energy is selected which is modified by adjusting knob 15 according to anatomical measure of the patient. The voltage only is so raised. The time for application of the energy so selected is then automatically determined or integrated by the machine to leave a uniform residue of photochemical energy to affect the film.

I claim as my invention:

1. In an X-ray apparatus of the valve tube rectified bridge type of circuit, the combination comprising an X-ray tube, an auto-transformer, a high tension step-up transformer, said auto-transformer being adapted to furnish current to said high tension transformer and the latter to furnish high tension current to said X-ray tube, said circuit including a magnet switch in the primary circuit of said high tenson transformer, an electronically controlled timer of the condenser discharge type, an exposure switch in circuit with said timer, a Potter-Bucky diaphragm, a magnetic release in said diaphragm, an X-ray switch in said diaphragm, and a plurality of condenser discharge resistors of different values all in circuit with said timer, said timer being connected so as to close said magnet switch when said exposure switch is closed, said Potter-Bucky diaphragm being also arranged in circuit with said exposure switch and said magnetic release whereby the operation of said exposure switch is able to actuate said release and, whereby the travel of the said diaphragm is able to close said diaphragm X-ray switch to start said timer and discharge the condensers of which through one of said resistances.

2. In an X-ray apparatus of the valve tube rectified bridge type of circuit, the combination comprising an X-ray tube, an auto-transformer, a high tension step-up transformer, said auto-transformer being adapted to furnish current to said high tension transformer and the latter to furnish high tension current to said X-ray tube, said circuit including a magnet switch in the primary circuit of said high tension transformer, an electronically controlled timer of the condenser discharge type, an exposure switch in circuit with said timer, a Potter-Bucky diaphragm, a magnetic release in said diaphragm, an X-ray switch in said diaphragm, and a plurality of condenser discharge resistors of different values all in circuit with said timer, said timer being connected so as to close said magnet switch when said exposure switch is closed, said Potter-Bucky diaphragm being also arranged in circuit with said exposure switch and said magnetic release whereby the operation of said exposure switch is able to actuate said release and, whereby the travel of the said diaphragm is able to close said diaphragm X-ray switch to start said timer and discharge the condensers thereof through one of said resistances, an X-ray filament regulator and valve filament regulator, a ballast resistor, an overload relay, a voltage addition coil for said auto-transformer, said voltage addition coil, said ballast resistor and said overload relay being in series with the high tension transformer primary and means for simultaneously adjusting both of said regulators, the value of the said condenser discharge resistances and the tripping point of the said overload relay, the value of the said ballast resistance and determining the position of the said exposure switch directly as between the said Potter-Bucky diaphragm and the said timer.

3. In combination in an X-ray apparatus, an X-ray tube having an anode and an incandescible cathode, a source of energy for exciting said tube and heating said cathode, manually controlled means calibrated in groups of anatomical parts for pre-selecting the period of excitation of said tube, manually controlled means calibrated in units for adjustment in accordance with the depth of a given anatomical part for pre-selecting the value of the excitation voltage of said tube, manually controlled means for pre-determining the value of the cathode heating energy and means rendered operative by said means for adjustment in accordance with depth of part in cooperation with said latter mentioned cathode-heating-energy predetermining means for maintaining said tube inoperative when the combined effect of the pre-selected period, intensity of tube excitation and value of cathode heating energy would result in a magnitude of tube energy which would overload said tube.

4. In an X-ray apparatus for obtaining energy quantities from which quantitative determinations may be based in relation to a pre-determined standard for any selected subject matter, the combination comprising an X-ray tube, a source of energy for energizing said tube, an anatomical calibrated time selecting device, an electronically controlled timer comprising a condenser electrically coupled to said time selecting device for controlling the time of tube energization, and a film density control comprising a variable resistor electrically coupled in the charging circuit of said condenser whereby the time intervals chosen by the time selecting device to be measured by the timer are multiplied by a factor so that radiographic deviations from a pre-determined standard may be obtained to effect quantitative determinations.

5. In combination in an X-ray apparatus, an X-ray tube having an anode and an incandescible cathode, means for exciting said tube and means for energizing said cathode, an anatomically calibrated time selecting device, an electronically controlled timer electrically coupled to said time selecting device and a density control electrically connected to said timer, said control being adapted to multiply by a pre-determined factor the time selected by the time selecting device, means for holding the milli-amperes in the cathode energizing circuit constant when the excitation voltage is varied and voltage control means calibrated in depth of anatomical parts for adjusting said excitation voltage.

6. In an X-ray apparatus employing a Bucky diaphragm, an X-ray tube, an electrical circuit to energize said tube, an electronically controlled timer operatively connected to said circuit to initiate and to terminate the period of tube energization, manually controlled means associated with said electronically controlled timer, a switch operated to closed position by the movable grid of the Bucky diaphragm during movement between its fixed limits, circuit means connecting said manually controlled means, switch and electronically controlled timer whereby the electronically controlled timer is actuated to initiate energization of the tube circuit by the cooperation of said manually controlled means and said switch.

7. In an X-ray apparatus, an X-ray tube having an anode and an incandescible cathode, an energy source and circuit for energizing said cathode, controlling means for adjusting the energy of said cathode circuit, an excitation circuit for said X-ray tube, a variable tap auto-transformer operatively connected in said circuit for controlling the tube excitation voltage, a voltage addition coil inductively coupled with said auto-transformer, switch means and circuit means whereby the voltage addition coil may be selectively connected to said excitation circuit, and a common actuator for simultaneously operating said controlling means for adjusting the cathode energy and said switch means.

8. In an X-ray apparatus of the valve tube rectified bridge type of circuit, the combination comprising an X-ray tube, an auto-transformer, a high tension step-up transformer, said auto-transformer being adapted to furnish current to said high tension transformer and later to furnish high tension current to said X-ray tube, a magnetic switch in the primary circuit of said high tension transformer, an electronically controlled timer of the condenser discharge type, an exposure switch in circuit with said timer for initiating the operation of said electronically controlled timer, a Potter-Bucky diaphragm, a magnetic release for actuating the movement of the said diaphragm, a switch actuated by movement of the said diaphragm and a plurality of condenser discharge resistors of different values all in circuit with said timer, said timer being connected to close said magnetic switch when said exposure switch is closed, said switch actuated by movement of the diaphragm also being arranged in circuit with said exposure switch and said magnetic release whereby the operation of the said exposure switch actuates said release and the ensuing travel of said diaphragm closes said switch to close the magnetic switch and discharge the condenser through one of said resistors.

9. In an X-ray apparatus, an X-ray tube having an incandescible cathode and an anode, means for exciting said tube and energizing said cathode, manual means for adjusting the voltage across said tube in accordance with the depth of anatomical part, means for determining the time of tube excitation comprising a manually controlled time selecting means calibrated according to grouping of anatomy members and radiography portions thereof for pre-selecting a period of tube excitation and a second manually controlled means for selectively conditioning the cathode circuit for use with either radiography screens or a Bucky diaphragm and for simultaneously modifying the action of the aforementioned manually controlled time selecting means.

10. In combination in radiographic apparatus, an X-ray tube having an anode and an incandescible cathode, a source of potential for exciting said tube and energizing said cathode, manually controlled means for pre-selecting the time of tube excitation for a given anatomical part, manually controlled means for pre-selecting the value of cathode heating energy, manually controlled means for pre-selecting the value of excitation voltage in accordance with the depth of the given anatomical part, and means rendered operative by the positioning of the first and second aforementioned manually controlled means for rendering the tube inoperative when the pre-selected positions of the aforementioned manually controlled means would result in improper radiographic conditions for the given anatomical part.

11. In an X-ray apparatus for obtaining energy quantities from which quantitative determinations may be based in relation to a predetermined standard for any selected subject matter, the combination comprising an X-ray tube, a source of potential for energizing said tube, controlling means for adjusting the potential in predetermined increments corresponding to the depths of the subject matter in accordance with the following equation:

$$PKV = \text{constant} + 2\, Dxk$$

wherein PKV is the peak kilovoltage, D is the thickness of the subject matter and $k$ is a correcting constant for the particular units of measurement employed, an adjustable timing device for determining the time of radiation, comprising a multiple time rack having a large number of separate resistances, a timing condenser adapted to discharge thru a selected one of said resistances and a variable resistance in the charging side of said condenser for modifying the action of the said timing device when adjusted to any one setting in predetermined increments whereby radiographic deviations from a predetermined standard may be obtained to effect quantitative determinations.

12. In an X-ray device the combination comprising an X-ray tube having an anode and an incandescible cathode, a circuit for exciting said tube, a source of potential for energizing said circuit, a circuit for supplying energy to said cathode, a source of energy for said cathode circuit, means for controlling the energy in said cathode circuit comprising a compensating transformer having a primary winding connected across the tube excitation circuit and the secondary winding connected with the cathode energizing circuit.

13. In an X-ray apparatus for obtaining energy quantities from which quantitative determinations may be based in relation to a predetermined standard for any selected subject matter, the combination comprising an X-ray tube having an anode and an incandescible cathode, a source of potential and circuit for exciting said tube, controlling means for adjusting the potential applied across the tube in predetermined increments corresponding to the depth of the subject matter in accordance with the following equation:

$$PKV = \text{constant} + 2D$$

wherein PKV is the peak kilovoltage and D is the thickness of the subject matter in centimeter units, a source of current and circuit for energizing said cathode, a translating device connected to the tube potential circuit and current source for modifying the cathode energizing circuit to maintain the current constant for all increments of tube excitation.

14. In an X-ray apparatus, an X-ray tube, a circuit for energizing said tube, a source of potential for energizing said circuit, a movable grid of the Bucky type adapted to be spring biased in one position under the subject to be radiographed, means for holding said grid in a second position under said subject, releasing means for said previously mentioned means, a timing circuit for said X-ray apparatus, a manually controlled switch connected in the timing circuit, a second switch connected in the timing circuit operated by said grid when it is positioned intermediate the afore-described positions and means for connecting the two switches in series.

15. In an X-ray apparatus, an X-ray tube having an anode and an incandescible cathode, an energy source and circuit for energizing said cathode, controlling means for adjusting the energy of said cathode circuit, an excitation circuit for said X-ray tube, a variable tap auto-transformer operatively connected in said circuit for controlling the tube excitation voltage, a voltage addition coil inductively coupled with said auto-transformer, switch means and circuit means whereby the voltage addition coil may be selectively connected to said excitation circuit, a timing device having a manual control for initiating and terminating the tube excitation period, means independent of said manual control for controlling said timing device, and a common actuator for simultaneously operating said control means, adjusting the cathode energy, said switch means and said last mentioned means.

16. In an X-ray apparatus for obtaining energy quantities from which quantitative determinations for any selected subject matter may be based in relation to a predetermined standard, the combination of elements comprising an X-ray tube having an anode and an incandescible cathode, a source of energy for exciting said tube, a rectifier bridge comprising hot cathode valves, a source of energy for the cathodes of said valves, a timing device comprising an electron discharge device and a condenser, resistors for controlling the discharge of said condenser in a circuit therewith, means for individually selecting and connecting a predetermined resistance in the circuit, means for controlling the actuation of the timing device, means for controlling the energization of said rectifier valves, means for controlling the energization of said tube cathode, a transformer for controlling the energy for exciting said tube, a voltage addition coil in inductive relationship with said transformer, means for controlling the output potential of said coil and a common actuator for simultaneously controlling all of said means.

17. In an X-ray radiating process for obtaining energy quantities from which quantitative determinations may be based in relation to a predetermined standard for any selected subject matter regardless of the depth of the part or the relative anatomical density of the part, the step which comprises selecting a standard energy quantity for any quantum of radiation by employing a peak kilovoltage derived from the equation:

$$PKV = \text{constant} + 2Dxk$$

wherein PKV is the peak kilovoltage, D is the thickness of subject matter and $k$ is a correcting constant for the particular units of measurement employed while maintaining the product of the milliampere seconds constant and the step of independently varying the product of the milli-ampere seconds for the selected subject matter by controlling the time in predetermined increments in order to obtain results which may be referred to the said standard to determine the quantitative relationship therebetween.

WILLIAM W. MOWRY.